3,658,746
SEGMENTED POLYURETHANE ELASTOMERS
Friedrich Karl Rosendahl, Leverkusen, Harald Oertel, Odenthal-Globusch, Heinrich Rinke, Leverkusen, and Wilhelm Thoma, Bergisch-Neukirchen, Germany, assignors to Farbenfabriken Bayer Aktiengesellschaft, Leverkusen, Germany
No Drawing. Filed Jan. 8, 1970, Ser. No. 1,560
Claims priority, application Germany, Jan. 22, 1969, P 19 02 931.3
Int. Cl. C08g 22/04
U.S. Cl. 260—30.8 DS    4 Claims

ABSTRACT OF THE DISCLOSURE

The objects of the invention are segmented polyurethane elastomers, preferably elastomeric fibers, foils and solutions thereof, being prepared by reacting an NCO—polymer with a semicarbazide-alkyl-amine or -arylamine as chain extending agents—up to 45 mol percent of the total amount of chain extenders—can be used. The reaction is effected in highly polar solvents. The obtained elastomers have improved properties, especially improved heat distortion temperature and improved hydrothermal properties. A further object of the invention are new semicarbazid amino compounds.

This invention relates to highly elastic, linear segmented polyurethanes (preferably in the form of highly elastic filaments) comprising segments resulting from the use of certain semicarbazidoamines as chain extenders, and to a process for producing these polyurethanes.

It is known that substantially linear, relatively high molecular weight NCO— preadducts (hereinafter referred to in short as NCO— preadducts or NCOC— prepolymers), prepared from relatively high molecular weight polyhydroxy compounds (optionally in the presence of relatively small quantities of low molecular weight diols) and a molar excess of organic diisocyanates, can be reacted, in highly polar organic solvents such as dimethylformamide, with substantially bifunctional chain extenders containing two active hydrogen atoms. This reaction gives viscous solutions of substantially linear polyurethane elastomers which can be processed from the solution into elastic filaments or films. Suitable chain extenders include in particular diamines, preferably aliphatic or araliphatic diamines, hydrazine or dihydrazide compounds. Diamines and hydrazine are highly reactive with respect to the NCO—preadducts, which preferably comprise aromatically-linked NCO groups, with the result that there is a danger of non-uniform crosslinked components ("jellyfish") being formed in the elastomer solution. Reduction of this tendency towards crosslinking calls for a number of chemical modifications and expensive technical equipment.

Dihydrazide compounds when used as chain lengthening agents (see DBP 1,123,467), however, have such a greatly reduced reactivity towards NCO— prepolymers that their reaction can be very easily controlled without unwanted chemical cross-linking and gelation of the solution taking place. Polyurethane elastomer solutions of this type can be spun into highly elastic threads which have a high tear resistance and low permanent elongation. It has been found, however, that when such elastomer threads are initially loaded, they undergo much more elongation in hot air than in air at room temperature and have a high residual elongation after removal of the load. The residual elongations are also large after hydrothermal treatment (e.g. in boiling water), especially if the elastomer threads are under an existing tension (e.g. at 100% elongation). This low resistance of such dihydrazide-lengthened elastomer threads to elongation under thermal or hydrothermal conditions is particularly undesirable in finishing and dyeing processes.

Furthermore, elastomer threads produced in this way, especially with carbodihydrazide as chain lengthening agent, undergo discoloration in the presence of traces of certain metal ions so that the appearance of the undyed fabric is easily impaired, even if no effect on the mechanical properties can be observed.

Aromatic dihydrazides, e.g. terephthalic acid dihydrazide, are only very sparingly soluble even in highly polar solvents, such as dimethylformamide. They cannot be made to react with NCO— prepolymers or only under unfavorable reaction conditions and at temperatures which are so high that they bring about rapid molecular weight degradation of the elastomers which are formed. If bis-semicarbazides such as 1,2-ethylene-bis-semicarbazide, 1,4-phenylene-bis-semicarbazide or 4,4'-diphenyl-methane-bis-semicarbazide are used instead of the dihydrazide compounds as chain lengthening agents for the reaction with NCO— prepolymers, these bis-semicarbazides are even less soluble so that depending on the structure of the bis-semicarbazides, they may themselves remain partly undissolved in boiling dimethylformamide. Furthermore, the elastomer solutions which are obtained cannot be spun by any technical process since they turn into a gel while they are being produced or shortly afterwards. The polyurethane elastomers produced are probably insufficiently solvated by the solvents and therefore separate out in the form of a pasty gel which is impossible or very difficult to shape into threads or foils. It is only by the addition of substantial quantities of salts such as LiCl, $CaCl_2$ or $CaBr_2$ that solutions can be prepared from this at elevated temperatures, but such an addition of salts adversely affects the spinning properties of the solutions. Similarly, when using aliphatic bis-semicarbazides as chain extending agents, e.g. 1,2-ethylene-bis-semicarbazide or 1,6-hexamethylene-bis-semicarbazide, it is not possible to produce technically spinnable solutions, as these reaction products have the tendency, to change into a gel-like state during or shortly after preparation.

Aminohydrazides, e.g. aminoacetic acid hydrazide, have also been proposed for use as chain lengthening agents for polyurethanes (British Pats. 1,082,938; 1,079,597 and 1,083,857). Polyurethanes which have been chain lengthened with aminoalkyl hydrazides, however, have relatively low melting points and threads obtained from such polyurethanes (which have been chain lengthened with aminohydrazide) show very unsatisfactory response to thermal or hydrothermal treatment, i.e. they undergo very high elongation under load at elevated temperatures and, in particular, when tested in hot water, and after release of the load they show very high residual elongations. Similarly, when threads or fabrics are maintained at certain elongations, they undergo a very sharp drop in tension in hot water. In many cases, the threads even break under the test conditions in hot water. This behavior of such polyurethane threads is a great disadvantage when fabrics produced from them are treated while under tension in hot water or steam, as in finishing and dyeing processes.

When aminoaryl hydrazides are used, unsatisfactory behavior to thermal and hydrothermal conditions is again found, which does not allow the use of such chain lengthening agents for high grade elastomer threads (see comparison tests in the examples).

The invention relates to highly elastic substantially linear segmented polyurethanes obtained from higher molecular weight isocyanate prepolymers and chain lengthening agents which contain the characteristic chain lengthening segment:

—NH—CO—NH—NH—CO—NH—R—NH—CO—NH—  R=—(CH$_2$)$_{2-6}$—

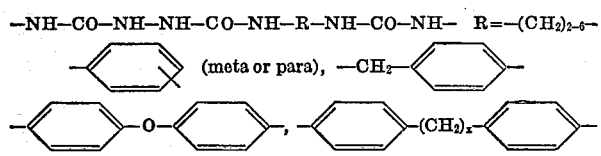

$x=0, 1, 2.$

Polyurethanes of this type can be prepared by reacting the higher molecular weight isocyanate prepolymers with substantially equivalent quantities of semicarbazide aryl- or semicarbazide alkyl-amines of the formula:

H$_2$N—NH—CO—NH—R—NH$_2$ (R is a divalent aliphatic or aromatic radical having the meaning given above), in highly polar organic solvents, followed by removal of the solvents by evaporation or coagulation. Linear segmented polyurethane elastomers are obtained in this way which consist of reaction products of higher molecular weight diisocyanates with chain lengthening agents which contain chain lengthening segments of the structure:

Other bifunctional chain lengthening agents may, however, be used in addition to the semicarbazide amines; preferably at least 55 mol percent of the chain lengthening agents required for the chain lengthening of the NCO— prepolymer consists of the semicarbazide amines. The elastomers obtained thus contain at least 55%, based on the total amount of chain lengthening segments present, of such segments of the structure:

In view of the known properties of elastomers which have been obtained using aminohydrazides as chain lengthening agents and the behavior of suitable bis-semicarbazides as chain lengthening agents, it was extemely surprising to find that semicarbazide amines of the formula:

H$_2$N—NH—CO—NH—R—NH$_2$ yield elastomers which have very good properties that are far superior to those of comparable elastomers obtained with aminohydrazide chain lengthening agents. In addition, the solubility of the semicarbazide amines in highly polar solvents is sufficient for carrying out a normal chain lengthening reaction. Particularly good properties are found in polyurethane elastomers which have been lengthened with β-semicarbazide ethylamine,
4-aminophenyl-semicarbazide,
3-amino-phenyl-semicarbazide,
4-aminobenzyl-semicarbazide and
4-aminodiphenylether-4'-semicarbazide.

Hence these compounds are advantageously used as bifunctional compounds which contain two active hydrogen atoms for chain lengthening NCO prepolymers, particularly in cases where the polyurethanes are to be worked up to form elastomer threads.

Additional examples of semicarbazide arylamines in accordance with the invention are 4-amino-diphenyl-4'-semicarbazide, 4-amino-diphenylmethane-4'-semicarbazide and 4-aminodiphenylethane-4'-semicarbazide.

After spinning the solution in the usual dry or wet spinning processes, such elastomers yield high grade elastomer threads which have substantially improved thermal and hydrothermal properties as well as very high values for strength and elastic properties. The threads and foils are color stable to the usual heavy metals, e.g. copper ions. The polyurethane elastomers are, moreover, readily soluble in the usual solvents such as dimethylformamide, dimethylacetamide, dimethylsulphoxide or N-methyl pyrrolidone and they have improved resistance to brown discoloration in light and improved resistance to oxidation. They have substantially better resistance to light than aromatic diamines; furthermore, comparable elastomer substances have substantially higher moduli and lower permanent elongations. The advantageous set of properties will be seen clearly from the comparison tests in the examples.

The compounds used as chain extenders (i.e. β-semicarbazido-ethylamine; γ-semicarbazido-propylamino; δ-semicarbazido-butylamine; ε-semicarbazido-pentylamine and ω-semicarbazido-hexylamine) are new compounds. Further up the homologous series, for example with ω-semicarbazido-octylamine ($x=8$ in the above formula), the behaviour of the chain-extended elastomers under thermal and hydrothermal conditions is again unsatisfactory. In particular, their melting points are reduced and their elastic properties deteriorate undesirably (for example the modulus is decreased while permanent elongation increases). In addition, the elastomer solutions prepared with them show a very marked tendency to assume very rapidly a gel-like consistency so that they cannot be spun.

The provision of outstanding properties by aliphatic semicarbazido-alkylamines is restricted to the chain extenders of the formula given above in which $x=2$ to $6$ (preferably $x$ is an even number, especially 2).

The new compounds can be obtained, for example, by carefully reacting hydrazine carboxylic acid phenyl ester with an excess of an alkylene diamine of the formula H$_2$N.(CH$_2$)$_x$.NH$_2$ wherein $x$ is a number from 2 to 6, and subsequently distilling off the phenol which is split off, or excess alkylene diamine, in vacuo, for example in a falling-film evaporator. When left standing in air, the semicarbazido-alkylamines quickly absorb carbon dioxide (up to 1 mol of CO$_2$) and are converted into the cordesponding carbonic acid salts (carbamates). These carbonic acid salts can be isolated in pure crystalline form, and for the reaction products of hydrazine carboxylic acid phenyl ester and alkylene diamines may readily be purified by precipitating the carbonic acid salts, for example form a solution in methanol by the addition of solid carbon dioxide. The carbonic acid salts of the unreacted alkylene diamines preferentially remain dissolved in alcohol. The carbonic acid salts of the semicarbazido-alkylamines may be converted, for example with oxalic acid, into the oxalates and the oxalates can be converted with barium hydroxide into highly purified semicarbazido-alkylamines (see preparation procedure).

Both the free semicarbazido-alkylamines and their carbonic acid salts may be used as chain extenders. However, while the semicarbazido-alkylamines, which are oils or low-melting crystalline compounds, dissolve in highly polar organic solvents at temperatures as low as room temperature to form clear solutions, the crystalline high-melting carbamates have to be dissolved at elevated temperatures in these solvents, solution being accompanied by the partial evolution of carbon dioxide.

While the crystalline aminosemicarbazido-carbamates (carbonic acid salts) have, for example, the composition $$1H_2N.NH.CO.NH.(CH_2)_x.NH_2 : 1CO_2$$

products which are correspondingly poorer in $CO_2$ are formed on heating in solvents such as dimethylformamide, accompanied by the evolution of $CO_2$. These products may also be used in the chain-extending reaction. However, it is best only briefly to heat the semicarbazido-alkylamines or their carbonic acid salts in solvents such as dimethyl formamide at relatively high temperatures (for example above 100° C.) because otherwise undesirable trans-acylation reactions can occur.

Furthermore the semicarbazide aryl-amines used as chain lengthening agents are new compounds and may be prepared, for example, by hydrazinolysis of phenyl esters of the aminoarylcarbamic acids.

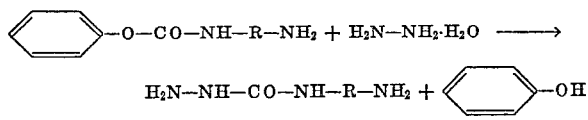

The elastomers are synthesized by reacting substantially linear, higher molecular weight NCO— prepolymers which have been prepared from higher molecular weight polyhydroxy compounds (if desired, with the addition of minor quantities of low molecular weight dihydroxy compounds) and excess diisocyanates in highly polar organic solvents with substantially equivalent quantities of chain lengthening agents (which are semicarbazide amines, if desired, in admixture with known chain lengthening agents). The following processes are given as examples of the basic methods of carrying out the preparation of elastomers which contain the

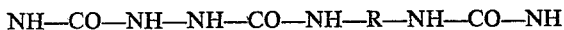

segment which has been obtained by the reaction of a compound $H_2N$—$NH$—$CO$—$NH$—$R$—$NH_2$ with the NCO groups of (higher molecular weight) diisocyanates:

(a) Reaction of an NCO prepolymer which has been prepared from higher molecular weight dihydroxy compounds and greater than molar quantities of diisocyanate (the NCO content of the prepolymer being approximately between 1% and 6% NCO based on the solids content) with substantially equivalent quantities of bifunctional low molecular weight chain lengthening agents which have two active hydrogen atoms in the presence of highly polar organic solvents, semicarbazide amines of the formula $H_2N$—$NH$—$CO$—$NH$—$R$—$NH_2$ being used as chain lengthening agent.

(b) Reaction as under (a) but in which the chain lengthening agent comprises at least 55 mol percent of the semicarbazide amines and up to 45 mol percent of the usual bifunctional compounds which contain two active hydrogen atoms and have molecular weights of 18 to about 300 (e.g. water, hydrazine, diamines, dihydrazides).

(c) Reaction of an isocyanate prepolymer which contains about 1 to 6% by weight NCO which has been prepared from higher molecular weight dihydroxy compounds, low molecular weight diols which contain 1 or 2 tertiary amino groups in the molecule and have molecular weights of 62 to about 300, in quantities of about 0.05 to 1.0 mol per mol of higher molecular weight dihydroxy compound, and greater than molar quantities of diisocyanates with substantially equivalent quantities of semicarbazide amines of the formula $$H_2N-NH-CO-NH-R-NH_2$$

as chain lengthening agents in highly polar solvents.

(d) Reaction of an isocyanate prepolymer prepared as described in process (c) with substantially equivalent quantities of chain lengthening agents, at least 55 mol percent of the semicarbazide amines $$H_2N-NH-CO-NH-R-NH_2$$

and up to 45 mol percent of the usual chain lengthening agents being used.

The products obtained by the process are linear segmented polyurethane elastomers which consist of characteristic intra-linear segments of the structure I:

[—(O—D—O—CO—NH—Ro—NH—CO—)$_r$
  (O—G—O—CO—NH—Ro—NH—CO)$_s$]$_m$—
[—NH—NH—CO—NH—R—NH
        —CO—NH—Ro—NH—NH—]$_n$ in which:

D represents a long chain, divalent, substantially aliphatic polymer residue of a higher molecular weight polyhydroxy compound which has a melting point below 60° C. and a molecular weight of 500 to 6000 which is without the terminal hydroxyl groups and without any substituents which are reactive with isocyanates;

Ro represents a divalent organic radical of an aromatic, aliphatic, cycloaliphatic, araliphatic or heterocyclic diisocyanate;

G represents a divalent aliphatic, cycloaliphatic or araliphatic radical of a dialcohol which has a molecular weight of between 62 and 300, preferably containing one or more tertiary aliphatic amino groups, without the terminal hydroxyl groups;

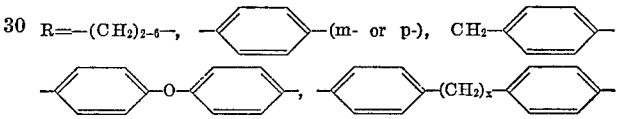

$x = 0$, 1 or 2;

$r$ represents an integer of at least 1, e.g. 1 to 5, preferably 1 to 3;

$s$ represents 0 or an integer of at least 1, e.g. 1 to 5, preferably 1;

$m$ represents an integer of at least 1, e.g. of 1 to 5, preferably 1 to 3; and $n$ represents an integer from 1 to 5, preferably 1 or 2.

These elastomers have an elongation at break of more than 300% and an inherent viscosity (determined in a 1% solution in hexamethyl phosphoramide at 25° C.) of at least 0.5 in order to give rise to sufficiently elastic properties in the threads and foils.

In addition to the structural segments of Formula I, the substantially linear, segmented polyurethane elastomers may consist preferably of up to a maximum of 45% by weight of intralinear segments which are obtained by reaction of the NCO prepolymers with further chain lengthening agents such as water, amino-alcohols or compounds containing two terminal $NH_2$ groups, and which have the structure II:

[—(O—D—O—CO—NH—Ro—NH—CO—)$_r$
  —(O—G—O—CO—NH—Ro—NH—CO)$_s$—]$_m$—
[—(NH—Z—NH—CO)$_p$—NH—Ro—NH—CO—]$_n$ in which D, G, Ro, $r$, $s$, $m$ and $n$ have the meanings indicated above, $p = 0$ or 1 and Z represents the radical of a known chain lengthening agent $H_2N$—$Z$—$NH_2$ free of its $NH_2$ groups, Z may be zero (i.e. a single bond) or a divalent organic radical, preferably containing 2 to 13 carbon atoms without substituents which would react with isocyanates, e.g. a divalent aliphatic or cycloaliphatic radical having at the most 13 carbon atoms, preferably the radicals

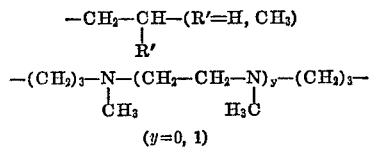

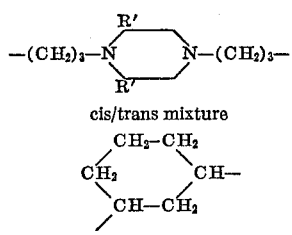

cis/trans mixture

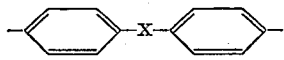

a divalent aromatic radical without condensed rings, preferably a

radical; X=zero, —O—, —CH$_2$—, —CH$_2$—CH$_2$—, $$-\underset{\underset{CH_3}{|}}{\overset{\overset{CH_3}{|}}{C}}-$$

or a divalent araliphatic radical, preferably a 1,3- or 1,4-

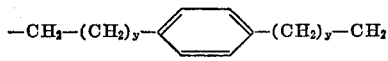

radical; y=0, 1; or a radical

—HN—CO—R"—CO—NH—

—HN—CO—NH—R"—NH—CO—NH— in which R" represents a divalent organic radical containing up to 13 carbon atoms, e.g. an aliphatic cycloaliphatic or aromatic radical, preferably a —HN—CO—(CH$_2$)$_y$—

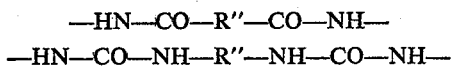

or

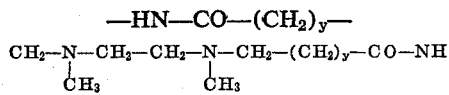

(CH$_2$)$_y$—CO—NH— radical or the radical

—HN—CO—(CH$_2$)$_2$—NH—CO—NH—

Suitable higher molecular weight, substantially linear polyhydroxy compounds with terminal hydroxyl groups (HO—D—OH) are, for example, polyesters, polyester amides, polyethers, polyacetals, polycarbonates or poly-N-alkyl urethanes, the above compounds having, if desired, additional groups such as ester, ether, amide, urethane or N-alkyl urethane groups, with molecular weights between 600 and 5000, preferably between 800 and 3000, and melting points advantageously below 60° C. and preferably below 45° C. Mixtures of the higher molecular weight polyhydroxyl compounds may also be used.

Particular examples are the polyesters of adipic acid and, if desired, mixtures of dialcohols, e.g. ethylene glycol, propylene glycol, butane-1,4-diol, hexane-2,5-diol, 2,2-dimethylpropane - 1,3 - diol, hexane - 1,6 - diol, 2-methylhexane - 1,6 - diol, 2,2 - dimethylhexane - 1,3 - diol, p - bis - hydroxymethylcyclohexane, 3 - methyl - pentane-1,4 - diol or 2,2 - diethylpropane - 1,3 - diol, preferably those with diols or mixtures of diols which have 5 or more carbon atoms. Such polyesters have a relatively high resistance to hydrolysis and, particularly when diols which have alkyl radicals in the side chain are included, they also give rise to a good low temperature elasticity in the end products. Polyesters which are obtained by the polyaddition of caprolactone and diethylene glycol with a narrow molecular weight distribution are also very suitable starting materials.

Polyurethane elastomers which have excellent resistance to hydrolysis can be obtained from polyalkylene ethers such as polytrimethylene ether diols or polypropylene glycols but, in particular, from polytetramethylene ether diols which may, if desired, also be used as copolymers (by incorporating small quantities of epoxides such as propylene oxide or epichlorohydrin by condensation) or after end group modification, e.g. replacement of the OH groups by the group

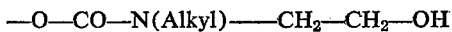

Polyepichlorohydrins with terminal OH groups in the given range of molecular weights are also suitable for the production of flame-resistant products. Basic polyethers in which the tertiary amino groups may be fully or partly quaternised are also suitable.

The polycarbonates used are those which contain hexane-1,6-diol as the only dialcohol or the predominant dialcohol in addition to other diols, or those obtained from ω-hydroxy-caproic acid-ω'-hydroxyhexyl esters.

The diisocyanates (O=C=N—Ro—N=C=O) which are used may be aliphatic, cycloaliphatic, araliphatic, aromatic or heterocyclic diisocyanates, or mixtures thereof. Special mention may be made of aromatic diisocyanates which have a symmetrical structure, e.g. diphenylmethane-4,4'-diisocyanate; diphenyldimethylmethane - 4,4' - diisocyanate; phenylene - 1,4 - diisocyanate; 2,2',6,6' - tetramethyldiphenylmethane - 4,4' - diisocyanate; diphenyl-4,4' - diisocyanate; diphenylether - 4,4' - diisocyanate or their alkyl-, alkoxy- or halogen-substituted derivatives; also toluylene - 2,4- or 2,6 - diisocyanates or commercial mixtures thereof; 2,4 - diisopropylphenylene - 1,3 - diisocyanate; m-xylylene diisocyanate; p-xylylene diisocyanate and α,α,α',α' - tetramethyl - p - xylylene diisocyanate; furthermore, alkyl or halogen substitution products of the above diisocyanates, e.g. 2,5 - dichloro - p - xylylene diisocyanate or tetrachloro - p - phenylene diisocyanate; dimeric toluylene - 2,4 - diisocyanate or bis - (3 - methyl-4-isocyanatophenyl)-urea.

Aliphatic diisocyanates such as hexane - 1,6 - diisocyanate, cyclohexane - 1,4 - diisocyanate, dicyclohexylmethane - 4,4' - diisocyanate, 1 - isocyanato - 3 - isocyanatomethyl - 3,5,5 - trimethylcyclohexane or 2,2,4-trimethylhexane - 1,6 - diisocyanate may also be used, either entirely or in part, and these yield products which undergo very little discoloration on exposure to light. Diisocyanates such as ω,ω'-di-(isocyanatoethyl)-benzene or 1,2,3,4,5,6 - hexahydro - diphenylmethane - 4,4' - diisocyanate also yield products which undergo little discoloration on exposure to light.

Owing to their commercial availability, it is particularly advantageous to use diphenylmethane-4,4'-diisocyanate, diphenyl ether - 4,4' - diisocyanate, p-phenylene diisocyanate, the isomeric toluylene diisocyanates and (if desired, in a limited proportion) hexane - 1,6 - diisocyanate and the cis/cis- and/or cis/trans- and/or trans/trans-isomers of dicyclohexylmethane-4,4'-diisocyanate.

To prepare the substantially linear higher molecular weight isocyanate prepolymers, the higher molecular weight polyhydroxyl compounds HO—D—OH described above are reacted with the diisocyanates in greater than molar quantities, e.g. in the molar ratio of 1:1.25 to 1:4.0, preferably 1:1.30 to 1:2.5, if desired with stepwise addition of the diisocyanates, in a melt or in solvents such as tetrahydrofuran, dioxane, ethyl acetate, butanone-2, chlorobenzene or dimethylformamide at temperatures of up to about 130° C., preferably 70 to 100° C. If dimethylformamide is used as reaction medium, temperatures of 20 to 70° are preferred. If the higher molecular weight hydroxyl compounds have comparatively low molecular weights, e.g. 650 to 1250, it is preferable to use the diisocyanates in low molar ratios of about 1:1.25 to 1:2.0, and if they have higher molecular weight, e.g. 1500 to 2500, it is preferable to use higher molar ratios, e.g. 1:1.5 to 1:2.5.

If a polyhydroxyl compound HO—D—OH is reacted with a diisocyanate OCN—Ro—NCO in the molar ratio of 1:2, an NCO— prepolymer which has the empirical formula

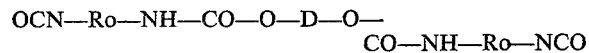

is obtained. If the reaction is carried out using a molar ratio of 1:1.5 (=2:3), the NCO— prepolymer formed has the general structure

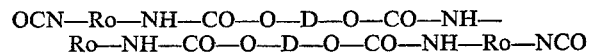

The structure obtained is formally the same if reaction of the polyhydroxy compounds is first carried out with the OH/NCO ratio of 2:1 and the new "prechain-lengthened" dihydroxy compound is then converted into the isocyanate prepolymer with the OH/NCO ratio of 1:2, if desired, using another diisocyanate. If other molar ratios are employed, corresponding statistical mixtures of the appropriate NCO— prepolymers may be formed.

In the preparation of the isocyanate prepolymers, minor quantities of low molecular weight diols HO—G—OH which have molecular weights of 62 to about 300, especially those which have one or more tertiary amino groups, may be included in addition to the higher molecular weight polyhydroxy compounds HO—D—OH in the reaction with the diisocyanates. The addition of these diols may be carried out at the same time with the higher molecular weight polyhydroxy compounds or at anytime during or after the formation of the NCO— prepolymer from the diisocyanate and higher molecular weight polyhydroxyl compounds. Examples of such diols include ethylene glycol, butane-1,4-diol, bis-N,N-($\beta$-hydroxyethyl)-methylamine, bis - N,N-($\beta$-hydroxypropyl)-methylamine, N,N'-dimethyl-N,N'-bis-($\beta$ - hydroxyethyl) - ethylenediamine, N,N'-dimethyl-N,N' - bis - ($\beta$ - hydroxypropyl)-ethylenediamine, N,N'-bis-($\beta$ - hydroxypropyl) - piperazine, N,N' - bis - ($\beta$ - hydroxyethyl) - piperazine or hydroquinone-bis-($\beta$-hydroxyethyl ether). The use of diols which have tertiary amino groups increases in particular the dyeability, improves the light fastness and provides point of reactivity for subsequent after-treatments such as cross-linking reactions with 4,4'-bis-chloro-methyldiphenyl ether.

The low molecular weight diols are generally used in quantities of 0.05 to 1.0 mol, preferably 0.05 to 0.5 mol and in particular 0.07 to 0.25 mol per mol of polyhydroxyl compound in the formation of the NCO— prepolymer. The quantity of diisocyanates used in these cases is preferably increased above the molar ratios given above by the amount corresponding to the low molecular weight diols, e.g. 0.05 to 1.0 mol. Isocyanate prepolymers of the following structure are then obtained:

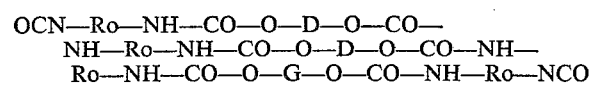

The typical structural segments of the isocyanate prepolymers (which may also be termed "higher molecular weight diisocyanates") which results from "prechain lengthening" or incorporation of glycol are formed in a more or less statistical sequence and may be repeated several times. The NCO group content of the isocyanate prepolymers (calculated as percent by weight of NCO in the solvent-free NCO— prepolymer) is of decisive importance for the properties of the polyurethane elastomers obtained from the prepolymers. On the whole, only those NCO— prepolymers which have an NCO content in the solid of at least 1.0% are suitable for reaction with semicarbazide arylamines which are used as chain lengthening agents according to the invention, and preferably the isocyanate prepolymers should have NCO contents of 1.5 to about 6% by weight. An NCO content of 1.75 to 3.5%, based on the solids content of the isocyanate prepolymer, is particularly desirable if the elastomers produced from the prepolymers are to be used for the production of elastomer threads.

The bifunctional chain lengthening agents containing two active hydrogen atoms are semicarbazide amines of the formula:

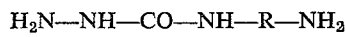

which are use in approximately equivalent quantities based on the NCO groups of the NCO— prepolymers, and they are preferably used as the sole chain lengthening agents. 4-aminophenylsemicarbazide, 4 - aminodiphenyl-ether-4'-semicarbazide and O-semicarbazide ethyl-amine are particularly preferred.

One may, however, also use preferably up to 45 mol percent of other, conventional chain lengthening agents which have molecular weights of 18 to about 300, such as water and no alcohols, glycols or compounds of the formula $H_2N$—Z—$NH_2$ in which Z has the meaning given above, in addition to at least 55 mol percent of the semicarbazide arylamines.

Such conventional chain lengthening agents may, for example, be water or organic compounds which have two terminal $NH_2$ groups, e.g. hydrazine (or hydrazine hydrate), aliphatic diamines, especially ethylene diamine, 1,2-propylene diamine, cis- and/or trans-1,3-diaminocyclohexane, N,N-bis($\gamma$-aminopropyl)-methylamine, N,N'-dimethyl-N,N'-bis-($\gamma$-aminopropyl)ethylene diamine, N,N'-bis($\gamma$-aminopropyl)-piperazine, N,N'-bis($\gamma$-aminopropyl)2,5-dimethyl piperazine, aromatic diamines, especially 4,4'-diaminodiphenylmethane, 4,4' - diaminodiphenyl ether, 4,4'-diaminodiphenylethane, 4,4'-diaminodiphenyl-dimethylmethane or araliphatic diamines such as m- or p-xylylene diamine, 1,4-bis-($\beta$-aminoethyl)-benzene, or $\alpha,\alpha,\alpha',\alpha'$-tetramethyl-p-xylylene diamine or dihydrazides, bis-semicarbazides or bis-carbazic esters such as carbodihydrazide, terephthalic acid dihydrazide, hydroquinone diacetic acid dihydrazide, aminoacetic acid hydrazide, methyl-amino-N,N-bis-(propionic acid hydrazide), piperazine-N,N'-bis-(propionic acid hydrazide), N,N' - dimethyl-ethylene diamine-N,N'-bis-(propionic acid hydrazide) or semicarbazidopropionic acid hydrazide.

The reactions may also be carried out with stepwise chain lengthening or by using mixtures of the chain lengthening agents.

In order to obtain a lower molecular weight or in order to obtain polyurethane elastomers which are still soluble in spite of possible molecular branching, minor quantities of monofunctional compounds may be used to give chain breaking reactions, e.g. 0.01 to 10 mol percent (based on the NCO content) of butylamine, dibutylamine, acetohydrazide, butyl semicarbazide, N,N-dimethyl-hydrazine or butanol-1.

The reaction of the isocyanate prepolymers with the chain lengthening agents is carried out with approximately equivalent quantities (based on the NCO content), e.g. 100 to 120%, preferably 100 to 110 mol percent, of chain lengthening agents, advantageously at temperatures of about 0 to 130° C., preferably 20 to 80° C., in solvents. The larger the excess of the chain lengthening agents used, the lower will be the molecular weight of the polyurethane, due to chain breaking. By careful addition of other, preferably less reactive aliphatic di- or tri-isocyanates, the molecular weight or solution viscosity can be adjusted to the desired value (according to German patent specification 1,157,386). When the desired viscosity has been reached, the end groups which have not yet reacted can be stabilized by reaction with monoisocyanates such as butyl isocyanate, carboxylic acid anhydrides such as acetic anhydride, phthalic acid anhydride or other acylating substances, e.g. acid chlorides or carbamic acid chlorides.

Suitable solvents for use in this process are highly polar, organic, water-soluble solvents which contain amide, urea or sulphoxide groups which are capable of forming powerful hydrogen bonds and which preferably have boiling points of about 140 to 225° C., for example dimethylformamide, diethylformamide, formamide, dimethylacetamide, formylmorpholine, hexamethyl phosphoramide, tetramethyl urea, dimethylsulphoxide, dimethyl cyanamide or mixtures thereof. Dimethylformamide or dimethylacetamide are preferred for commercial use. A certain proportion, amounting up to about 33% by weight of the total quantity of solvent, of less polar solvents which are not capable by themselves of dissolving polyurethanes or polyurethane ureas, e.g. tetrahydrofuran, dioxane, acetone, glycolmonomethyl ether acetate or chlorobenzene, may be added to the highly polar solvents. The concentration of elastomer solutions should be about 5 to 43% by weight, advantageously 10 to 33% and preferably 15 to 28% by weight, and the viscosities should lie between about 1 and 1000 poises, preferably between about 50 and 800 poises at 800° C. The molecular weight of the segmented elastomers according to the invention should be so high that the inherent viscosity measured at 25° C.

$$\eta_i = \frac{\ln \eta R}{C}$$

is at least 0.5 and preferably 0.70 to 1.9 when 1.0 g. of elastomer has been dissolved in 100 ml. of hexamethyl phosphoramide solution (phosphoric acid trisdimethylamide) at 20° C. In the above equation, $\eta_R$ is the relative viscosity (ratio of the time required for the solution to flow through to the time required for the solvent to flow through) and C is the concentration in g./100 ml. The melting points of the elastomers should have values above 200° C. determined on a Kofler block and preferably above 230° C. if they are to be used as a starting material for elastomer threads.

Organic or inorganic pigments, dyes, optical brightening agents, U.V. absorbents, phenolic antioxidants, special light protective agents such as N,N-dialkyl semicarbamides or N,N-dialkyl hydrazides and cross-linking substances such as paraformaldehyde, melamine hexamethylol ether or other formaldehyde derivatives such as dimethylol-dihydroxyethylene urea, dimethylol-ethylene urea, trimethylol melamine, dimethylol urea dimethyl ether, quaternizing agents such as dichloromethyl-durene or polyaziridine ureas, such as hexamethylene-ω,ω-bis-ethyleneimide-ureas may be added to the solutions of the polyurethanes or polyurethane ureas. A cross-linking reaction, e.g. initiated by heat, alters the resistance to solution or swelling in highly polar solvents.

The elastomer solutions can be freed from the solvent by many different known processes by evaporation or coagulation, e.g. with simultaneous formation of the resuired shaped products such as threads or foils. Films or coatings are produced by drying the elastomer solution on supports such as glass plates or textile products. Threads can be obtained by wet or dry spinning processes. Microporous coatings are obtained by painting elastomer solutions on if desired, textiles or other supports (e.g. fleeces), possibly with the action of moist air and subsequent coagulation in non-solvents for the polyurethane, e.g. water or aqueous solutions. The microporosity of the films can be enhanced by suitable additives such as finely divided salts, emulsifiers or soluble polyamides.

In the following examples, the temperatures are given in degrees centigrade. The films or threads given in the examples were produced and measured by the following standard processes:

FILMS

These were produced by painting the elastomer solution on glass plates and drying (30 minutes at 70° C. +45 minutes at 100° C.), final thickness approximately 0.15 to 0.25 mm. These were partly cut up into threads of about 250 to 800 d. tex. thickness by means of a foil cutting machine and then tested.

WET SPINNING PROCESS

An elastomer solution preferably having a concentration of 20% is spun at the rate of about 1 ml. per minute through a die which has 20 apertures of 0.12 mm. diameter into a coagulation bath which is at a temperature of 80 to 85° C. and consists of 90% by weight of water and 10% by weight of dimethylformamide (length approximately 3 m.), and after passage through a washing zone (water at 90° C.), the product is wound at a draw-off rate of 5 m. per minute. The spools are kept in hot water (50° C.) for one hour and then dried.

DRY SPINNING PROCESS

An elastomer solution, preferably at a concentration of 24 to 26%, is spun through a die of 16 apertures of 0.20 mm. diameter into a 5 m. long shaft which is heated to 220 to 250° C. and into which air at a temperature of about 210 to 280° C. is blown. The threads are drawn off at a rate of about 100 m./min. and after they have been dressed with a talcum suspension they are wound, e.g., at a rate of 125 to 175 m./min., if desired, with stretching. The threads can then be given a thermal aftertreatment on spools or in a continuous form (the spinning rates may also be higher, e.g. 300 to 400 m./min.).

The elongation at break is measured in a tearing machine in which the length of thread clamped into the machine is measured by a light barrier and compensation is provided for the slip at the clamps.

The elastic values are defined by determining the 300% modulus in the first elongation curve, the 150 modulus (in the third return curve) and the permanent elongation (after 3 times elongation to 300%, 30 seconds after release of the load).

Determination of the heat distortion temperature (HDT) of elastomer threads:

The titre is determined on elastomer threads which have been laid out for about 3 hours without tension under normal atmospheric conditions (assessment of a piece of thread which is under initial loading of 0.045 mg./d. tex.). An elastomer thread which has a length of 250 mm. between the clamps is suspended under an initial loading of 1.8 mg./d. tex. at room temperature in a tube which contains air or is filled with nitrogen. The tube is surrounded by a heating jacket through which thermostatically heated silicone oil flows. The temperature in the tube is at first raised to about 125° in about 30 minutes. It is then raised at the rate of 3° C. every 5 minutes until a change in length of the elastomer thread to more than 400 mm. has taken place. The results obtained are plotted on a graph in which one unit on the abscissa corresponds to a temperature difference of 10° C. and one unit on the ordinate corresponds to a change in length of the elastomer thread of 20 mm. The heat distortion temperature (HDT) is taken as that temperature which is obtained by vertical projection of the point of contact of a 45° tangent with the temperature/length curve on the abscissa.

The thermal resistance of the elastomer is assessed inter alia according to the HDT value, the higher the HDT value found, the higher the thermal resistance of the elastomers is estimated. The value should be at least 140° and for high grade elastomer threads at least 145° and preferably higher than 150°.

Determination of the hot water tension drop (HWSA) of elastomer threads:

A piece of thread which has a length of 100 mm. between the clamps (initial loading rate 0.9 mg./d. tex.) is stretched by 100% at 20° C. and the thread tension obtained after 2 minutes (mg./d. tex.) is measured (1st value). The thread stretched to 100% is then immersed in water at 95° C. and the tension resulting after 3 minutes in the water is determined (2nd value). After this measurement, the thread is removed from the water bath and kept at room temperature for 2 minutes. The prestretched thread still inserted in the clamps is then relieved of load until free from tension and the residual elongation is immediately determined (3rd value). Scheme of representation in the examples (abbreviation HWSA):

| 1st value | 2d value | |
|---|---|---|
| Tension values | | 3d value |
| In air at 20° (mg./d. tex.). | In water at 95° (mg./d. tex.). | Residual elongation after release of load (in air) at 20°, percent. |

The hydrothermal properties are regarded as being higher the greater the amount of the 2nd value (tension in hot water, in mg./d. tex.) and the smaller the 3rd value (the residual elongation after treatment without load). The tension value in water should be at least 13.5 mg./d. tex., and high grade elastomer threads are required to have a value of at least 18 mg./d. tex. The residual elongation after hydrothermal treatment should be less than 45% after release of load and preferably less than 40%.

Determination of the hot water elongation (HWL) of elastomer threads:

A weight of 27 mg./d. tex is suspended on the end of a piece of thread 50 mm. in length by means of a clamping device and the thread is left to hang freely in air at room temperature for 25 minutes. After a loading time of 25 minutes, the percentage elongation is determined (1st value). The thread which has been stretched in this way is then immediately dipped in water at 95° C. with the pretensioning weight and the elongation which occurs in water is read off after 25 minutes. The result is given as a percentage elongation based on the initial length between the clamps of 50 mm. (2nd value). The loaded thread is then removed from the hot water bath, and by lifting the weight until no tension is applied to the thread, the residual elongation remaining is determined (3rd value).

Scheme of representation in the examples (abbreviation HWL):

| 1st value | 2d value | |
|---|---|---|
| Elongation | | 3d value |
| In air at 20° (percent). | In water at 95° (percent). | Residual elongation (after release of load) in air at 20° (percent). |

The hydrothermal properties are regarded as higher the smaller the second value (elongation in hot water) and the smaller the third value (permanent elongation after release of load).

For high grade elastomer threads, the second value should be less than 250% and preferably less than 150%; the residual elongation (3rd value) should be less than 150% and preferably less than 100%.

The melting point of the elastomer substance is determined on a strip of film after the strip has been lying on a Kofler block for 2 minutes, and for elastomer threads it should be above 200° and preferably above 230°.

PREPARATION OF THE ω-SEMICARBAZIDO-AMINES

(1) β-semicarbazido-ethylamine (a) β-semicarbazido-ethylamine carbonate.—304 parts of hydrazine carboxylic acid phenyl ester are introduced with stirring over a period of 30 minutes into 1600 parts of ethylene diamine (while cooling with an ice bath to an internal temperature of from 10 to 20° C.), and the resulting mixture is stirred for another hour at room temperature. All the volatile components are then distilled off in vacuo (12 torr) at a bath temperature of 60° C. The oily residue is taken up in 2500 parts of methanol and the carbonate of the semicarbazido-ethylamine is precipitated by the introduction of carbon dioxide. The crude carbonate is purified by dissolving it with heating in 1000 parts of water (carbon dioxide being given off), adding 2000 parts of methanol and then precipitating it again in carbonate form by the addition of carbon dioxide. A fine white powder is obtained in a yield of 251 parts, or 78% of the theoretical. The substance melts with decomposition at around 154 to 156° C. (depending upon the heating rate). Molecular weight after amine titration 162 (calculated 162). For titration, 500 to 800 mg. of substance are dissolved in water (optionally under heat), an equal volume of acetone is added, followed after brief standing by titration with 0.5 n HCl against bromphenol blue.

*Analysis.*—Calculated for $C_4H_{10}N_4O_3$ (162) (percent): C, 2.6; H, 6.17; O, 29.65. Found (percent): C, 29.8; H, 6.20; O, 30.10.

(b) Purification of β-semicarbazido-ethylamine by way of oxalate.—162 parts of β-semicarbazido-ethylamine carbonate are suspended while stirring in 1000 parts of water, followed by the gradual addition of 132 parts of oxalic acid dihydrate. When the evolution of carbon dioxide stops, 100 parts of methanol are added as a result of which the oxalate of β-semicarbazido-ethylamine crystallises out in the form of a colorless prism (183 parts=88% of the theoretical).

*Analysis.*—Calculated for $C_5H_{12}N_4O_5$ (molecular weight 208) (percent): C, 28.8; H, 5.67; N, 26.9; O, 38.4. Found (percent): C, 28.8; H, 5.90; N, 26.2; O, 39.1.

176 parts of the oxalate are dissolved in 1500 parts of water, followed by the addition while stirring at room temperature of a solution of 266.5 parts of barium hydroxide octahydrate in 1420 ml. of water. After the barium oxalate precipitated has been filtered off, the filtrate is concentrated in the absence of carbon dioxide at 40 to 50° C./12 torr. The residue is taken up in 100 ml. of methanol, filtered off from the undissolved component and freed from methanol in vacuo.

Pure β-semicarbazido-ethylamine is obtained in a yield of 97 parts, in the form of a pale yellowish oil $n_D^{20}$=1.5273) which crystallizes after standing in a refrigerator.

*Analysis.*—Calculated for $C_3H_{10}N_4O$ (molecular weight 118) (percent): C, 30.5; H, 8.48; N, 47.4. Found (percent): C, 30.7; H, 8.80; N, 47.4.

(2) ω-Semicarbazido-propylamine (in the form of its carbonate)

45.6 parts of hydrazine carboxylic acid phenyl ester are introduced while cooling to 5 to 10° C. (30 minutes) into 148 parts of 1,3-propylene diamine, and the reaction mixture is then stirred at room temperature for 2 hours. After some haze has been filtered off, all the volatile constituents are distilled off from the filtrate at 40° C./0.02 torr, the residue (94 parts) is dissolved in 500 parts of methanol and Dry Ice is added to the resulting solution. The carbonate (54 parts) is precipitated in the form of a colorless deposit. For purification, it is reprecipitated, dissolved in 100 parts of water at 60° C., clarified with active carbon, 500 parts of methanol are added to the clear filtrate and Dry Ice is added until precipitation is complete.

The carbonate now accumulates in the form of a pure white powder melting (with decomposition) at 158 to 162 C. Titration of the amino group gives a molecular weight of 177 (calculated 176).

Analysis.—Calculated for $C_5H_{12}N_4O_3$ (molecular weight 176) (percent): C, 34.1; H, 6.80; N, 31.8; O, 27.3. Found (percent): C, 33.7; H, 6.90; N, 31.8; O, 27.8.

(3) ω-Semicarbazido-butylamine carbonate

A solution of 60.8 parts of hydrazine carboxylic acid phenyl ester in 200 parts of methanol is added dropwise over a period of 30 minutes to a solution of 352 parts of 1,4-tetramethylene diamine in 20 parts of methanol at an internal temperature of from 5 to 10° C. After standing at room temperature, the methanol is distilled off in vacuo and the residue is dissolved in 3500 parts of methanol. The carbonate of ω-semicarbazido-butylamine is precipitated by the addition of solid carbon dioxide until precipitation is complete, and is immediately filtered off under suction. Yield 95 g., M.P. 157 to 163° C. After solution in water, followed by the addition of 5 times the quantity of methanol (based on water), and then by saturation with $CO_2$, the product is obtained after solution and reprecipitation in the form of a pure colorless powder of M.P. 165 to 167° C. (with decomposition/ Kofler block). Amine titration gives a molecular weight of 189 (calc. 190).

(4) ω-Semicarbazido-hexylamine carbonate

A solution of 60.8 parts of hydrazine carboxylic acid phenyl ester in 200 parts of methanol is added over a period of 30 minutes at 5 to 10° C. to a solution of 464 parts of 1,6-hexamethylene diamine in 200 parts of methanol. After 4 hours at room temperature, 3000 parts of methanol are added and carbon dioxide is introduced until there is no no further precipitation. The precipitated crude product (97 g.) is dissolved under heat in 300 parts of water, and clarified with active carbon, and the filtrate is diluted with 1000 parts of methanol and $CO_2$ is introduced until there is no further precipitation. 69 g. of carbonate are obtained in the form of a pure white powder, M.P. 160 to 165° C. with decomposition (Kofler). Amine titration gives a molecular weight of 216 (calc. 218).

(5) ω-Semicarbazido-octylamine carbonate

A solution of 60.8 parts of hydrazine carboxylic acid phenyl ester in 250 parts of methanol is added over a period of 40 minutes while cooling (5 to 10° C.) to a solution of 576 parts of 1,8-octamethylene diamine in 475 parts of methanol, followed by stirring for 1 hour at room temperature. The carbonate of ω-semicarbazidooctylamine (contaminated by a little octamethylene diamine carbonate) is precipitated by the addition of excess Dry Ice in a yield of 142 g., M.P. 100 to 110° C. with decomposition. The carbonate is dissolved under heat in 700 parts of water, 2500 parts of methanol are added, followed by addition of Dry Ice until there is no more precipitation. The precipitated carbonate is repeatedly dissolved and reprecipitated in the same way and then gives 50 parts (51% of the theoretical) of ω-semicarbazido-octylamine carbonate in the form of a white powder melting at 150 to 151° C. with decomposition (Kofler block).

Analysis.—Calculated for $C_{10}H_{22}N_4O_3$ (molecular weight 246) (percent): C, 48.8; H, 8.9; N, 22.8; O, 19.5. Found (percent): C, 48.6; H, 8.6; N, 22.6; O, 20.2. Molecular weight after amine titration: 254.

(6) 4-aminophenyl-semicarbazide 214 g. of the phenyl ester of 4-aminophenyl-carbamic acid in 1000 ml. of tetrahydrofuran (the hydrogenation solution being freed from Raney nickel) are introduced into a reaction vessel. 135 g. of hydrazine hydrate are added dropwise at 60° C. After addition of the hydrazine hydrate is completed, the reaction mixture is heated to boiling under reflux for one hour. The tetrahydrofuran is removed from the solution under vacuum until the first crystallisation of 4-aminophenyl-semicarbazide sets in. On cooling, the solution solidifies to a thick crystalline paste. When this has been stirred up with 100 ml. of isopropanol, the crystallizate is removed by suction filtration and again washed with isopropanol. The product is recrystallized from 0.8 ml./g. of water+1.0 ml./g. of methanol, yield 75% of the theory, M.P. 158°.

Calculated for $C_7H_{10}N_4O$ (166.2) (percent): N, 33.71. Found (percent): N, 33.8.

(7) 4-aminobenzyl-semicarbazide 94.3 g. of 4-nitrobenzylaminohydrochloride in 400 ml. of water are introduced into a reaction vessel. 75 g. of phenylchlorocarbonic acid ester and 40 g. of caustic soda, 40 g. of soda in 300 ml. of water, are added dropwise simultaneously at 5 to 10°. 4-nitrobenzyl-carbamic acid phenyl ester, M.P. 84 to 85° is obtained in a 70% yield.

Calculated for $C_{14}H_{12}N_2O_4$ (272.3) (percent): N, 10.29. Found (percent): N, 10.25.

85 g. of the phenyl ester of 4-nitrobenzyl-carbamic acid are hydrogenated under a hydrogen pressure of 60 atmospheres at 40° C. after the addition of 20 g. of Raney nickel in 300 ml. of dimethylformamide. Phenyl 4-aminobenzylcarbamate is obtained in practically quantitative yield.

75 g. of phenyl 4-aminobenzylcarbamate are dissolved in 100 ml. of methanol. This solution is run through a dropping funnel into 55 g. of hydrazine hydrate in 100 ml. of ethanol. When the exothermic reaction has died down, 150 ml. of isopropanol are added. 4-aminobenzyl-semicarbazide crystallises on cooling; yield 65%; M.P. 133°.

(8) 4-aminodiphenyl ether-4'-semicarbazide 262 g. of 4-nitro-4'-aminodiphenyl ether are dissolved in 425 ml. of pyridine. 178 g. of phenylchlorocarbonate are added dropwise to the solution at 15° in the course of about 30 minutes. The reaction mixture is then heated at 40° for 30 minutes. The entire reaction mass is stirred into 2 litres of ice water and the crude product after being freed from pyridine hydrochloride is removed by suction filtration and washed twice with water. Phenyl 4-nitro-diphenyl ether-4'-carbamate is obtained in 94% yield, M.P. 181°.

190 g. of phenyl 4-nitrodiphenyl ether-4'-carbamate are hydrogenated in 700 ml. of tetrahydrofuran at a hydrogen pressure of 60 atmospheres at 50° C. after the addition of 50 g. of Raney nickel. The hydrogenating solution, freed from catalyst, is immediately heated to boiling with 85 g. of hydrazine hydrate for one hour. After removal of the tetrahydrofuran by distillation, the residue is stirred with 500 ml. of isopropanol and filtered with suction after cooling. 84 g. (61% of the theoretical) of 4-aminodiphenyl ether-4'-semicarbazide are obtained. The dry crude product is recrystallized from 3 ml./g. of glycol monomethyl ether acetate, M.P. 164°.

Calculated for $C_{13}H_{14}N_4O_2$ (258.3) (percent): N, 21.69. Found (percent): N, 21.4.

PREPARATION OF THE AMINO HYDRAZIDES FOR THE COMPARISON TESTS (9) 4-amino-benzoic acid hydrazide Known from the literature.

(10) Preparation of 1,4-phenylene-bis-semicarbazide for comparison test 48 g. of 1,4-phenylene diisocyanate are heated for 2 hours at 150° C. with 300 g. of phenol, and after cooling to 120°, reacted with 100 g. of hydrazine hydrate for 6 hours at 100 to 120°. The reaction mixture is then boiled with 750 ml. of methanol and the resulting 1,4-phenylene-bis-semicarbazide is suction filtered when cold. 51 g. yield; the colorless crystals decompose with brown discoloration without melting above 300°.

(11) 4-aminodiphenyl ether-4'-carboxylic acid hydrazide 30 g. of the methyl ester of 4-aminodiphenyl ether-4'-carboxylic acid are heated to boiling in 50 ml. of pyridine with 20 g. of hydrazine hydrate for 5 hours. 4-aminodiphenyl ether-4'-carboxylic acid hydrazide crystallizes on cooling. It is removed by suction filtration and freed from hydrazine hydrate adhering to it by washing it with isopropanol. Yield 67%; M.P. 170 to 172° C.

Calculated for $C_7H_{10}N_4O$ (166.2) (percent): N, 33.71. 17.28. Found (percent): N, 17.3.

PREPARATION OF THE POLYURETHANE ELASTOMERS.—EXAMPLE I 1000 parts of a mixed polyester of adipic acid and a glycol mixture of 1,6-hexane diol and 2,2-dimethyl propane diol (molar ratio of the glycols 65:35), molecular weight 1650, are heated for 40 minutes at 94 to 97° C. with 19.90 parts of N,N-bis-($\beta$-hydroxypropyl)-methylamine, 273.8 parts of diphenylmethane-4,4-diisocyanate and 325 parts of chlorobenzene, after which the mixture is cooled to room temperature. The NCO— preadduct solution has an NCO content of 1.82% (corresponds to 2.28% NCO in the solid substance).

Reaction with $\omega$-semicarbazido-ethylamine carbonate

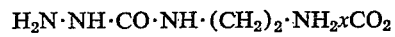

$H_2N \cdot NH \cdot CO \cdot NH \cdot (CH_2)_2 \cdot NH_2 x CO_2$ 15.15 parts of the $\omega$-semicarbazido-ethylamine carbonate (purified by solution in and reprecipitation from water/methanol/$CO_2$, cf. preparative specification 1) are introduced into 925 parts of dimethylformamide heated to 145° C., dissolving to form a clear solution accompanied by the vigorous evolution of $CO_2$. 410 parts of the NCO— preadduct described above are introduced with vigorous stirring into this solution after it has been cooled to 75° C., giving a homogeneous elastomer solution with a viscosity of 358 poises/20° C. The elastomer solution is pigmented with 4% by weight of rutile followed by the addition of 0.15 part of hexane-1,6-diisocyanate, the viscosity rising to 520 P/20° C. through reaction with the terminal groups of the elastomer.

The filaments obtained by wet-spinning (cf. general procedures) show outstanding mechanical strengths, favorable elastic properties and particularly good hydrothermal properties (cf. Table 1) which give much more favorable values than extension with aminoacetic acid hydrazide (cf. comparison test (a)).

Comparison test (a) with aminoacetic acid hydrazide

$H_2N \cdot NH \cdot CO \cdot CH_2NH_2$ 7.96 g. of aminoacetic acid hydrazide are dissolved in 904 parts of hot dimethylformamide. 410 parts of the NCO— preadduct solution of Example I are introduced into this solution, giving an elastomer solution with a viscosity of 370 poises/20° C.

After pigmenting with 4% by weight of rutile, the elastomer solution has added to it 0.13 part of hexane-1,6-diisocyanate, producing a rise in viscosity to 545 poises/20° C.

The filaments obtained by wet spinning show outstanding strength properties, although their elastic properties are inferior to those of the filaments in Example I. The hydrothermal properties are extremely poor, preventing the filaments from being used as high grade elastomer filaments (HWSA; HWL; HDT). The melting point, too, is very low (cf. Table 1).

Comparison test (b)

4.05 parts of ethylene-bis-semicarbazide are dissolved at 100° C. in 231 parts of dimethylformamide.

100 parts of the NCO— preadduct solution prepared in accordance with Example I are introduced into the solution after it has been cooled to 70° C., resulting immediately in the formation of a stiff, friable swollen elastomer paste, which even after heating to 100° C. and dilution to 18% by weight solids content cannot be converted into a spinnable solution. Neither is it possible to obtain a solution by using dimethylacetamide or N-methyl pyrrolidone instead of dimethylformamide as solvent.

EXAMPLE II 16.45 parts of $\omega$-semicarbazido-propylamine carbonate (cf. preparative specification (2)) are introduced into 925 parts of dimethylformamide heated to 145° C. (carbon dioxide being given off) and the clear solution formed is cooled to 85° C. 410 parts of the NCO— preadduct solution from Example I are stirred into this solution. The elastomer solution (236 P) is then pigmented with 4% by weight of rutile, followed by the addition of 0.156 part of 1,6-hexane diisocyanate. The elastomer solution formed (505 P) is wet-spun in the usual way.

The results set out in Table 1 show that filaments of outstanding mechanical strength, high elasticity and excellent hydrothermal properties are obtained, being far superior to the elastomer filaments obtained by extension with $\omega$-aminopropionic acid hydrazide in comparison test (c).

Comparison test (c)

9.56 parts of $\omega$-aminopropionic acid hydrazide are dissolved in 907 parts of warm dimethylformamide, followed by the addition to the resulting solution of 405 parts of the NCO— preadduct solution prepared as described in Example I. After pigmenting with 4% by weight of rutile, the elastomer solution (625 poises/20° C.) is wet-spun in the usual way. The filaments show outstanding mechanical strength but limited modulus and high permanent elongation. Their hydrothermal properties are totally unsatisfactory (cf. Table 1).

EXAMPLE III 17.5 parts of semicarbazido-butylamine carbonate (cf. preparative specification 3) are introduced into 931 parts of dimethylacetamide heated to 145° C. ($CO_2$ is given off). 400 parts of an NCO— preadduct solution (1.80% by weight NCO, corresponds to 2.25% by weight NCO in the solid substance) prepared in accordance with Example I are introduced into the solution after it has been cooled to 80° C., and the homogeneous highly viscous clear elastomer solution is diluted with 110 parts of dimethylacetamide. After pigmenting with 4% by weight of $TiO_2$ (rutile), based on elastomer solid substance, the elastomer solution has a viscosity of 770 poises.

The elastomer solution can be wet- or dry-spun by conventional standard processes (cf. Table 1). The distortion temperature of the filaments (HDT) is 152.5° C.

If by contrast $\omega$-aminobutyric acid hydrazide is used as chain extender in the reaction with the above-mentioned prepolymer, an elastomer solution is obtained which cannot be dry-spun and which in wet-spinning cannot be spun into the usual hot coagulating baths (90° C.), but only into cold water.

The elastomers show extremely poor hydrothermal properties.

EXAMPLE IV 20.1 parts of $\omega$-semicarbazido-hexylamine carbonate (cf. preparative specification 4) are introduced into 940 parts of hot dimethylformamide (145° C.), a solution quickly being formed accompanied by the evolution of HCl. 400 parts of an NCO— preadduct solution prepared in accordance with Example I are stirred into the solution, cooled to 80° C. and the clear homogeneous elastomer solution is pigmented with 4% by weight of rutile (based on elastomer solid substance). The elastomer solution (660 poises/20° C.) is left at a temperature of 40° C. and is either wet- or dry-spun into elastomer filaments or converted into films. The elastomer solution, after standing for a prolonged period at room temperature, shows a tendency towards limited paste formation, losing some of its fluency. The solution can be converted back into a free-flowing spinnable form by stirring at a slightly elevated temperature (for example 40 to 50° C.). If the above reaction is carried out in dimethylacetamide, free-flowing elastomer solutions are obtained.

The elastomer filaments show much improved thermal and hydrothermal properties in comparison with the elastomeric filaments extended with aminocaproic acid hydrazide in comparison example (d), (cf. Table 1).

Comparison test (d)

13.9 parts of $\omega$-aminocaproic acid hydrazide are dissolved in 919 parts of dimethylformamide at 90° C., followed by the addition of the NCO— preadduct solution of Example I (425 parts). After pigmenting with 4% by weight of rutile, the solution has a viscosity of 115 poises.

The elastomer solution can only be spun into cold coagulation baths (with temperatures lower than 40° C.). At higher temperatures, some of the filaments break in the spinning bath. The elastomer filaments thus obtained are extremely soft, have a low modulus, high permanent elongation and extremely poor hydrothermal properties (cf. Table 1). They melt at 195° C., softening to a considerable extent at temperatures beyond 180° C.

Comparison test (e)

Chain extension with $\omega$-semicarbazido-octylamine (not claimed).

22.5 parts of $\omega$-semicarbazido-octylamine carbonate are dissolved at 145° C. in dimethylformamide ($CO_2$ being given off) followed by the addition at 80° C. of 408 parts of an NCO— preadduct solution prepared as in Example I. When hot, the elastomer solution obtained is still free-flowing (contains a few non-homogeneous "knots") but very soon stiffens on cooling into a very hard gel-like form which it cannot be made free-flowing again by moderate heating. Evidently, the solvent power of the solvent is no longer sufficient to dissolve the elastomer and keep it in solution, and is therefore unsuitable for large-scale spinning into elastomer filaments. Although it is possible in certain circumstances (by immediately spinning the hot solution) to obtain filaments, the filaments obtained again show very poor properties (modulus decreases, permanent elongation relatively high, and hot-water elongation undesirably high).

EXAMPLE V 1000 parts of the mixed polyester described in Example I are heated for 50 minutes at 96° C. with 18 parts of N,N-bis-($\beta$-hydroxypropyl)-n-methylamine and a solution of 163.6 g. of p-phenylene diisocyanate in 299 parts of chlorobenzene. The NCO— preadduct solution now has an NCO content of 1.65% by weight. 400 parts of the NCO— preadduct solution are stirred into a solution of 9.96 parts of $\omega$-semicarbazido-ethylamine (cf. preparative specification 1b) in 910 parts of dimethylacetamide at room temperature. After pigmenting with 4% by weight of $TiO_2$ (based on elastomer solids content), the elastomer has a solution viscosity of 546 P.

Spinning an elastomer solution diluted to a solids content of 20% by weight by conventional spinning processes gives filaments of extremely high HDT (170° C.), excellent hydrothermal properties and outstanding resistance to discoloration and degradation on exposure to light. The filaments have a melting point (Kofler block) of above 235° C. (cf. Table 1).

EXAMPLE VI 400 parts of the NCO— preadduct solution described in Example V are introduced at room temperature into a solution of 8.96 parts of $\omega$-semicarbadizo-ethylamine and 0.50 part of ethylene diamine in 908 parts of dimethylacetamide, resulting in the formation of a homogeneous stable elastomer solution with a viscosity of 270 poises/20° C. After pigmenting with 4% by weight of $TiO_2$ (rutile), the solution has its viscosity adjusted to 530 poises/20° C. by the addition of 0.2 part of 1,6-hexane diisocyanate. After dilution to a concentration of 20% by weight, the solution (viscosity 118 poises/20° C.) is wet-spun into filaments which are distinguished by their extremely high HDT (167° C.), favorable hydrothermal properties and limited permanent elongation. The filaments are substantially unaffected by light (they do not lose any of their mechanical strength and show only limited discoloration). The elastomer solution remains stable in its viscosity over several months as well as retaining its free-flow properties (cf. Table 1).

EXAMPLE VII 800 parts of a mixed polyester of adipic acid and a diol mixture of 60 mol percent of 1,6-hexane diol and 40 mol percent of 2,2-dimethyl-1,3-propane diol (molecular weight 2160) are heated for 50 minutes at 85 to 88° C. with 14.9 parts of N,N-bis-($\beta$-hydroxypropyl)-N-methylamine and a solution of 187.4 parts of diphenyl methane-4,4'-diisocyanate in 254 parts of chlorobenzene. The NCO— preadduct solution formed has an NCO content of 1.87% by weight.

400 parts of the above NCO— preadduct solution are introduced over a period of three minutes into a solution of 11.31 parts of semicarbazido-ethylamine in 914 parts of dimethylacetamide at room temperature, resulting in the formation of a viscous homogeneous elastomer solution. After pigmenting with 4% by weight of $TiO_2$ (based on elastomer solids content), the solution has a viscosity of 234 poises. The solution is stable in it viscosity and free-flow properties over a period of several weeks, (cf. Table 1).

EXAMPLE VIII 800 parts of a polytetramethylene ether diol (molecular weight 1010) are heated for 35 minutes at 65° C. with 68.4 parts of tolylene-2,4-diisocyanate and 118 parts of chlorobenzene, and then for 115 minutes at 68 to 69° C. with another 172 parts of diphenyl methane-4,4'-diisocyanate in 142 parts of chlorobenzene to complete formation of the NCO— preadduct. The NCO content then amounts to 1.88% by weight.

3.89 parts of semicarbazido-ethylamine carbonate are introduced into 232 parts of dimethylformamide heated to 140° C., the semicarbazido-ethylamine salt being dissolved accompanied by the evolution of some $CO_2$. After the solution has been cooled to 70° C., 103 parts of the NCO— preadduct solution are introduced with intensive stirring, resulting in the formation of a clear homogeneous highly viscous solution (283 poises/20° C.). The solution is cast into films (for results see Table 1). The $\eta_i$-value is 1.04 (cf. Table 1).

TABLE 1

| Example No. (type of chain extension) | Spinning process | Fineness (den.) | Elastic properties ||||| Thermal and hydrothermal properties |||||||
|---|---|---|---|---|---|---|---|---|---|---|---|---|---|
| | | | Tensile strength (g./den.) | Breaking elongation (percent) | Modulus, 300% (mg./den.) | Modulus 150% 3d recovery curve (mg./den.) | Permanent elongation after 3×300% elongation (percent) | HTD (°C.) | HWSA strain ||| Residual elongation after-hot-water treatment (percent) | HWL elongation |||
| | | | | | | | | | In air 20° C. (mg./den.) | In water 95° C. (mg./den.) | | | In air 20° C. (percent) | In water 95° C. (percent) | After relaxation (in air 20° C.) (percent) | Melting point, Kofler block, °C. |
| Example I (extension with β-aminoethyl semi-carbazide) | N | 299 | 0.73 | 505 | 197 | 22 | 13 | 159 | 43.5 | 17.5 | 33 | 66 | 230 | 94 | >235 |
| Comparison test a (extension with β-amino-acetic acid hydrazide) | N | 294 | 0.79 | 503 | 133 | 18 | 16 | 134 | 27.6 | 12.4 | 46 | 140 | 1 >800 | | >210 |
| Comparison test b (extension with ethylene-1,2-bis-semicarbazide) | N | Solution thickens appreciably; cannot be spun |||||||||||||
| Example II (extension with ω-semicarbazido-propylamine carbonate) | N | 312 | 0.82 | 510 | 228 | 22 | 11 | 152 | 40.9 | 19.5 | 26 | 74 | 276 | 94 | >215 |
| Comparison test c (extension with ω-amino-propionic acid hydrazide) | N | 285 | 0.66 | 490 | 76 | 12 | 18 | 122 | 20.2 | 2.3(f) | 81(f) | 240 | 2 >600 | | >215 |
| Example III (extension with ω-semicarbazido-butylamine) | {N<br>T*<br>T* | 291<br>176<br>302 | 0.81<br>0.74<br>0.77 | 516<br>407<br>534 | 194<br>370<br>187 | 23<br>22<br>20 | 14<br>15<br>17 | 163<br><br>149.5 | 40.6<br>38.2<br>23.0 | 16.2<br>18.6<br>17.6 | 34<br>35<br>40 | 70<br>94<br>128 | 276<br>310<br>276 | 108<br>114<br>112 | >235<br><br>>233 |
| Example IV (extension with ω-semicarbazido-hexylamine) (CO₂) | {N<br>F | 164<br>336 | 0.68<br>0.67 | 346<br>517 | 507<br>146 | 21<br>20 | 14<br>16 | | 35.5<br> | 17.8<br> | 23<br> | 78<br> | 188<br> | 72<br> | 225<br> |
| Comparison test d (extension with ω-amino-caproic acid hydrazide) | {N<br>T*<br>T** | 146<br><br> | 0.42<br><br> | 167<br>Cannot be spun<br>Filaments break in water | 41 | 8 | 26 | <120 | | | | 548 | (3) | 4 >195 | |
| Example V | F | 323 | 0.45 | 620 | 34 | 7 | 14 | 170 | 41.0 | 17.7 | 34 | 72 | 200 | 78 | 235 |
| Example VI | F | 312<br>368 | 0.67<br>0.61 | 582<br>656 | 145<br>108 | 22<br>20 | 13<br>11 | | 37.0 | 17.5 | 31 | 74 | 238 | 86 | |
| Example VII | N<br>F | 301<br>371<br>308<br>383 | 0.61<br>0.73<br>0.65<br>0.61 | 570<br>660<br>581<br>664 | 145<br>101<br>132<br>123 | 21<br>18<br>19<br>19 | 10<br>18<br>12 | 157 | 39.4 | 17.6 | 40 | 80 | 282 | 108 | 225 |
| Example VIII | {N<br>F | 313 | 0.65 | 624 | 102 | 21 | 13 | | | | | | | | |

¹ Sinks to bottom of measuring vessel.
² Broke after very quick elongation.
³ Broken in water.
⁴ Marked softening from 180°.
*Wound onto bobbins under 30% pre-elongation and thermofixed for 1 hour at 130° C.
**Wound onto bobbins under 50% pre-elongation and thermofixed for 1 hour at 130° C.

NOTE.—F=measurements made on filaments cut from films obtained by brushing the solution onto glass plates and evaporating off the solvent at 100° C.; N=standard wet-spinning process in which 20% by weight elastomer solutions are spun into a bath of 90% by weight of water and 10% by weight of dimethylformamide; T=standard dry-spinning process (cf. description in text).

The elastomer filaments of Examples I to VIII do not show any tendency toward discoloration when treated with dilute solutions of heavy metal salts (for example CuSO₄) or after washing or hydrolysis tests in soap/soda solution at 90° C.

In the case of the elastomers of Examples 1 to 8, the intrinsic viscosity is in the range from 0.7 to 1.9.

EXAMPLE IX 200 g. of a copolyester of adipic acid and a diol mixture of hexane-1,6-diol and 2,2-dimethylpropane-1,3-diol (molar ratio of glycols 65:35), molecular weight 1650, are heated with 4.0 g. N,N-bis-(β-hydroxypropyl)methylamine, and 53.8 g. of diphenylmethane-4,4'-diisocyanate at 100° for 90 minutes. The melt is taken up in 200 g. of chlorobenzene and cooled to room temperature. The NCO content of the NCO prepolymer solution is 1.14% (corresponding to 2.03% of NCO in the solid substance).

Reaction with 4-aminophenyl-semicarbazide

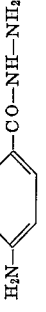

$H_2N-\langle\text{phenyl}\rangle-NH-CO-NH-NH_2$ 4.65 g. of 4-aminophenyl-semicarbazide are dissolved in 300 g. of dimethylformamide. 200 g. of the NCO prepolymer solution are run into this solution of the chain lengthening agent with vigorous stirring at 20°, a homogeneous, clear, highly viscous elastomer solution being formed; solids content 23.1%, M.P. 250 to 255° (Kofler block). The threads obtained by the wet spinning process (see general method of procedure) have high mechanical strength values, advantageous elastic properties and particularly good hydrothermal properties (see Table 2) and substantially better values than those obtained when using 4-aminobenzoic acid hydrazide as chain lengthening agent (see Comparison test (f)).

Comparison test (f) with 4-aminobenzoic acid hydrazide

$H_2N-\langle\text{phenyl}\rangle-CO-NH-NH_2$ 4.30 g. of 4-aminobenzoic acid hydrazide are dissolved in 300 g. of dimethylformamide. 200 g. of NCO—prepolymer solution are stirred into the solution of chain lengthening agent at 20°. A clear, viscous elastomer solution which has a solids content of 23.1%, M.P. 220 to 225° (Kofler block) is obtained.

The threads obtained by the usual wet spinning process have low tensile strength, low moduli, poor thermal and hydrothermal properties (see Table 2).

Comparison test (g) with 1,4-phenylene-bis-semicarbazide 150 g. of dimethylformamide are added to 3.19 g. of 1,4-phenylene-bis-semicarbazide which is in a very finely powdered state and the mixture is heated until the dimethylformamide boils. The bis-semicarbazide remains largely undissolved. A chain lengthening reaction with the NCO—prepolymer is not therefore possible.

When the 3.19 g. of 1,4-phenylene-bis-semicarbazide are heated to 150° with 150 parts of dimethylacetamide, about 95% of the substance is dissolved. When 100 g. of the NCO— prepolymer solution according to Example IX are introduced into the hot filtered solution, an elastomer solution of low viscosity which has a strong yellow coloration is at first obtained, and on cooling, this solution rapidly loses its fluidity and is converted into a pasty gel which can no longer be worked up by a technical process into threads or foils.

EXAMPLE X 200 g. of the polyester described in Example IX are heated with 3.24 g. of N,N-bis-($\beta$-hydroxyethyl)methylamine and 55.0 g. of diphenylmethane-4,4'-diisocyanate for 90 minutes at 100°. The melt is taken up in 200 g. of dioxane. The NCO content of the NCO— prepolymer solution is 1.24% (which corresponds to 2.20% NCO in the solid substance).

Reaction with 4-aminodiphenyl ether-4'-semicarbazide

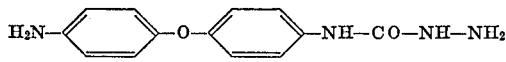

8.00 g. of 4-aminodiphenyl ether-4'-semicarbazide are dissolved in 320 g. of dimethylformamide. 200 g. of the NCO— prepolymer solution are stirred in at 45°. A highly viscous, 23% elastomer solution is obtained which is worked up into films and threads in the usual manner. The threads are distinguished by excellent elastic, thermal and hydrothermic properties (see Table 2).

Comparison test (h) with 4-aminodiphenyl ether-4'-carboxylic acid hydrazide

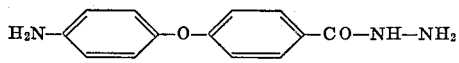

7.40 g. of 4-aminodiphenyl ether-4'-carboxylic acid hydrazide are dissolved in 300 g. of dimethylformamide. 200 g. of the NCO— prepolymer solution are run in at 20° with vigorous stirring. The highly viscous, 23.7% elastomer solution obtained is worked up into threads and films in the usual manner (properties see Table 2). The threads have only very moderate hydrothermal properties.

EXAMPLE XI 200 g. of a polytetramethylene glycol ether obtained from tetrahydrofuran (OH number 57) and 4.0 g. of N,N-bis-($\beta$-hydroxypropyl)-methylamine are heated with 30.4 g. of 1,4-phenylene diisocyanate for 60 minutes at 100°. The melt is then taken up in 156 g. of dioxane so that a 60% solution of NCO— prepolymer is formed. The NCO content is 1.26% (which corresponds to 2.13% of NCO in the solid substance).

4.10 g. of 4-aminophenyl-semicarbazide are dissolved in 300 g. of dimethylformamide. 160 g. of the NCO— prepolymer are run in at 20° with vigorous stirring. The resulting 21.5%, highly viscous elastomer solution is worked up into threads and films in the usual manner. The threads are distinguished by their good elastic properties and excellent thermal and hydrothermal properties (see Table 2).

EXAMPLE XII 4.45 g. of 4-aminobenzyl-semicarbazide are dissolved in 300 g. of dimethylformamide. 160 g. of the NCO— prepolymer solution described in Example XI are run in at 20° with vigorous stirring. A highly viscous, 21.6% elastomer solution is obtained, from which threads and films are produced in the usual manner. The threads have good elastic properties and excellent thermal and hydrothermal properties (see Table 2).

EXAMPLE XII 200 g. of the polytetramethylene glycol ether (OH number 57) described in Example XI and 4.0 g. of N,N-bis-($\beta$-hydroxypropyl)-methylamine are heated at 100° for 45 minutes with 36.6 g. of toluylene diisocyanate (isomeric mixture 2,4- to 2,6- as 65:35). The melt is dissolved in 160 g. of tetrahydrofuran. The NCO content is 1.58% (which corresponds to 2.62% of NCO in the solid substance).

5.50 g. of 4-aminophenyl-semicarbazide are dissolved in 300 g. of dimethylformamide. 170 g. of NCO— prepolymer solution are stirred in at 20°. A highly viscous, 22.5% elastomer solution is obtained which is worked up into threads and films in the usual manner (see Table 2).

EXAMPLE XIV 350 g. of a hydroxypolycarbonate (from $\omega$-hydroxyhexyl-$\omega'$-hydroxycaproic acid ester, made from hexane-1,6 - diol and $\epsilon$-caprolactone) and diphenylcarbonate, which has an OH number of 66.0, and 7.0 g. of N,N-bis-($\beta$-hydroxypropyl)-methylamine are dissolved in 139 g. of dimethylformamide. 59.5 g. of 1,4-phenylene diisocyanate are added to the solution of the polyhydroxy compounds. The reaction temperature is allowed to rise to 40° and this temperature is maintained for 45 minutes. The NCO content of the solution is then 1.60% (corresponding to 2.14% in the solid substance).

5.00 g. of 4-aminophenyl-semicarbazide are dissolved in 300 g. of dimethylformamide. 154 g. of the 75% solution of NCO— prepolymer are stirred in at 20°. A highly viscous, 25.0% elastomer solution is obtained which is worked up into films and threads in the usual manner. The threads are distinguished by excellent thermal and hydrothermal properties (see Table 2).

EXAMPLE XV 100 g. of a copolyester of adipic acid and a glycol mixture of hexane-1,6-diol and 2,2-dimethylpropane-1,3-diol (molar ratio of glycols 65:35), molecular weight 1690, are heated with 2.69 g. of hydroquinone-bis-($\beta$-hydroxyethyl ether) and 27.1 g. of diphenylmethane-4,4'-diisocyanate for 60 minutes at 100°. The melt is taken up in 100 g. of dioxane, the NCO content is 1.22% (which corresponds to 2.20% of NCO in the solid substance).

3.35 g. of 4-aminophenql-semicarbazide and 1.60 g. of $\beta$-semicarbazide-propionic acid hydrazide are dissolved in 50 g. of formamide and diluted with 225 g. of dimethylacetamide. 200 g. of the NCO— prepolymer solution are stirred into the solution of chain lengthening agent at 30°. A viscous, clear elastomer solution is obtained which is worked up into films and threads in the usual manner (see Table 2).

EXAMPLE XVI 80.0 g. of a copolyester of adipic acid and a mixture of ethylene glycol and butane-1,4-diol (molar ratio of diols 1:1) which has an average molecular weight of 2045 are dehydrated for one hour at 130°/12 mm. Hg and after the copolyester has been cooled to 50°, 1 mm. of a 35% solution of $SO_2$ in dioxane is added. After the addition of 176 g. of diphenylmethane-4,4'-diisocyanate and 244 g. of dimethylformamide, the formation of NCO— prepolymer solution is left to proceed at 45° for 115 minutes until the NCO content is 2.37%.

107.5 g. of the NCO— prepolymer solution are stirred into a solution of 4.1 g. of 4-aminophenylsemicarbazide in 233 g. of dimethylacetamide, a solution of low viscosity being first formed, the viscosity of which reaches a final value of 420 poises/20° C. after several hours.

The solution is worked up into films and threads in the usual manner (see Table 2).

EXAMPLE XVII 107.5 g. of the NCO— prepolymer solution from Example XVI are introduced into a solution of 3.8 g. of 4-aminophenylsemicarbazide and 0.073 g. of ethylene diamine (molar ratio of the chain lengthening agents 95:5) in 232 g. of dimethylformamide, the viscosity rising to 346 poises/20° C. after about 3 hours. The solution is worked up into films and threads (see Table 2).

EXAMPLE XVIII 107.5 g. of the NCO— prepolymer solution from Example XVI are stirred into a solution of 3.6 g. of 4-aminophenylsemicarbazide and 0.12 g. of hydrazine hydrate (molar ratio of chain lengthening agents 90:10) in 232 g. of dimethylformamide, the solution viscosity amounts to 458 poises/20° C. after several hours. The solution can be worked up in the usual manner into films and threads which have good hydrothermal properties.

EXAMPLE XIX 218 g. of the NCO— prepolymer solution from Example XVI are stirred into a solution of 2.2 g. of 4-aminophenylsemicarbazide and 1.17 g. of 1,1-phenylene diamine in 460 g. of dimethylformamide, the viscosity rising to 62 poises/20° C. The properties can be determined after the usual shaping into films or threads (see Table 2). The very high value of the heat distortion temperature (HDT) is particularly striking.

Reaction with 3-aminophenyl-semicarbazide

 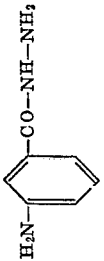

TABLE 2

| Example No. (type of chain lengthening) | Thread forming process | Titre, d. tex | Tensile strength g./d. tex. | Elongation at break, percent | Modulus 300% mg./d. tex. | Modulus 150% 3d return curve mg./d. tex. | Permanent elongation after 3×300% elongation percent | Melting point, Kofler bench, °C. | HDT, °C. | HWSA In air 20° mg./d. tex. | HWSA In water 95° mg./d. tex. | Residual elongation after hydrothermal stress, percent | HWL elongation In air 20°, percent | HWL elongation In water 95°, percent | After release of load (in air 20°) percent |
|---|---|---|---|---|---|---|---|---|---|---|---|---|---|---|---|
| Example IX, lengthening with 4-aminophenyl semicarbazide | N | 313 | 0.71 | 400 | 119 | 16 | 11 | 250 | 153 | 36.6 | 14.2 | 34 | 74 | 270 | 118 |
|  | F | 282 | 0.68 | 530 | 97 | 20 | 11 | | | | | | | | |
| Comparison test f, 4-aminobenzhydrazide | N | 335 | 0.37 | 680 | 60 | 10 | 17 | 220 | 126 | 15.5 | 5.0 | 59 | 286 | 232 | Tearing |
|  | F | 347 | 0.69 | 610 | 94 | 16 | 13 | 265 | 162 | 29.5 | 17.2 | 30 | 92 | | 98 |
| Example X, 4-aminodiphenyl ether-4'-semicarbazide | N | 324 | 0.61 | 610 | 112 | 14 | 17 | 210 | 114 | 16.0 | 6.3 | 63 | 222 | | Tearing |
|  | F | 306 | 0.57 | 555 | 65 | 12 | 15 | 260 | 197 | 49.4 | 28.9 | 35 | 44 | 56 | 24 |
| Comparison test h, 4-aminodiphenyl ether hydrazide | N | 316 | 0.57 | 580 | 105 | 15 | 19 | | | | | | | | |
| Example XI, 4-aminophenylsemicarbazide | F | 364 | 0.78 | 670 | 150 | 20 | 14 | 250 | 185 | 42.2 | 21.9 | 36 | 54 | 112 | 30 |
|  | N | 315 | 0.67 | 580 | 169 | 18 | 14 | | | | | | | | |
| Example XII, 4-aminobenzylsemicarbazide | F | 357 | 0.69 | 660 | 107 | 16 | 15 | 240 | 156 | 33.1 | 16.2 | 36 | 36 | | |
|  | N | 337 | 0.69 | 605 | 99 | 14 | 16 | | | | | | | | |
| Example XIII, 4-aminophenylsemicarbazide | F | 328 | 0.44 | 630 | 76 | 15 | 14 | 260 | 192 | 40.8 | 23.3 | 43 | 48 | 92 | 46 |
|  | N | 332 | 0.69 | 430 | 168 | 19 | 32 | | | | | | | | |
| Example XIV, 4-aminophenyl semicarbazide | F | 421 | 0.59 | 570 | 154 | 16 | 18 | 215 | 156 | 43.2 | 17.8 | 45 | | | |
|  | N | 345 | 0.60 | 465 | 129 | 15 | 16 | | | | | | | | |
| Example XV, 4-aminophenyl semicarbazide/semicarbazide | F | 384 | 0.56 | 520 | 76 | 17 | 15 | 161 | 34.9 | 18.3 | 38 | 74 | 258 | 106 | |
|  | N | 250 | 0.51 | 404 | 131 | 14 | 11 | | | | | | | | |
| Example XVI, 4-aminophenyl semicarbazide | F | 470 | 0.78 | 598 | 84 | 19 | 12 | 160 | 35.0 | 16.7 | 38 | 64 | 242 | 104 | |
| Example XVII, 4-aminophenyl semicarbazide/ethylene diamine (95:5) | N | 265 | 0.52 | 420 | 113 | 20 | 12 | | | | | | | | |
|  | F | 459 | 0.72 | 619 | 80 | 19 | 10 | | | | | | | | |
| Example XVIII, 4-aminophenyl semicarbazide/hydrazine hydrate (90:10) | N | 321 | 0.57 | 462 | 102 | 19 | 10 | 160 | 34.3 | 16.3 | 35 | 86 | 218 | 126 | |
|  | F | 448 | 0.77 | 623 | 81 | 20 | 15 | | | | | | | | |
| Example XIX 4-aminophenylsemicarbazide/1,4-phenylene diamine (55:45) | N | 266 | 0.52 | 481 | 97 | 18 | 15 | 166 | 34.4 | 18.6 | 35 | | | | |

NOTE.—F=Results of measurements on cut threads from films which are produced by painting the solution on glass plates and evaporating off the solvent at 100°; N=Standard wet spinning process, 20% by weight of elastomer solutions are spun into a bath of 90% water and 10% dimethylformamide.

The elastomer threads indicated in the Examples 1 to 7 undergo no discoloration on treatment with dilute solutions of heavy metal salts (e.g. copper sulphate) or after washing or hydrolysis tests in soap/soda solution at 90°. The value of the inherent viscosity in the elastomers in Table 2 lies within the range of 0.7 to 1.9.

EXAMPLE XX 200 g. of the polyester described in Example I are heated with 4.0 g. of N,N-bis-(β-hydroxypropyl)methylamine and 54.2 g. of diphenylmethane-4,4'-diisocyanate for 90 minutes at 100° C. The melt is taken up in 200 g. of dioxane. The NCO content of the NCO— prepolymer solution is 1.24% (which corresponds to 2.20% of NCO in the solid substance).

5.15 g. of 3-aminophenyl-semicarbazide are dissolved in 300 g. of dimethylformamide. 200 g. of the NCO— prepolymer solution are stirred in at 20° C. A highly viscous, 23.3% elastomer solution which has a viscosity of 200 poises/20° C. is obtained. This solution is worked up into films and threads in the usual manner. The threads are distinguished by excellent elastic and good thermal and hydrothermal properties.

Comparison test (j) with 3-aminobenzoic acid hydrazide 4.70 g. of 3-aminobenzoic acid hydrazide are dissolved in 300 g. of dimethylformamide. 200 g. of the NCO—prepolymer solution are stirred in at 20° C. The resulting 23.5% elastomer solution (108 poises/20° C.) is worked up into threads and films in the usual manner. The threads have only very moderate hydrothermal properties.

wherein
$x = 0, 1, 2$;
$r =$ an integer of 1 to 5;
$s = 0$ or an integer of 1 to 5;
$m =$ an integer of 1 to 5; and
$n =$ an integer of 1 to 5.

TABLE 3

| Type of chain lengthening agent | Example XX | | Comparison test j | |
|---|---|---|---|---|
| | 3-aminophenyl-semicarbazide | | 3-aminobenzoic acid hydrazide | |
| Thread forming process | N | F | N | F |
| Titre (d. tex.) | 316 | 398 | 313 | 337 |
| Tensile strength (g./d. tex.) | 0.74 | 0.65 | 0.61 | 0.58 |
| Elongation at break (percent) | 460 | 490 | 505 | 563 |
| Modulus, 300% (mg./d. tex.) | 114 | 112 | 72 | 45 |
| Modulus, 150% (mg./d. tex.) | 21 | 21 | 14 | 18 |
| Permanent elongation after 300% elongation (percent) | 9 | 8 | 18 | 16 |
| Melting point (° C.) | 230 | | 224 | |
| HTD (° C.) | 156 | | 123.5 | |
| HWSA: | | | | |
| Tension in air, 20° (mg./d. tex.) | 37.8 | | 19.5 | |
| Tension in water, 95° (mg./d. tex.) | 18.3 | | 5.7 | |
| Residual elongation (percent) | 37 | | 63 | |
| HWL: | | | | |
| Elongation in air 20° (percent) | 64 | | 162 | |
| Elongation in water 95° (percent) | 260 | | Tearing | |
| After release of load in air (percent) 20° | 112 | | | |

What we claim is:

1. Linear, segmented polyurethane elastomers consisting of reaction products of diisocyanate terminated prepolymer with chain lengthening agents which contain at least 55%, based on the total amount of chain lengthening segments present, of a chain lengthening segment of the structure:

NH—CO—NH—NH—CO—NH—
R—NH—CO—NH— wherein R is

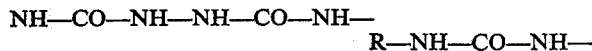

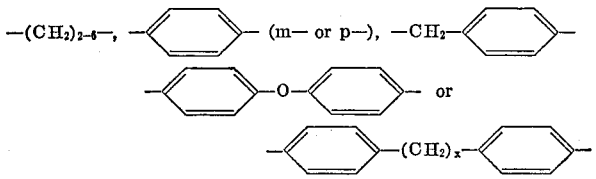

wherein $x = 0, 1, 2$.

2. Linear, segmented polyurethane elastomers which have an elongation at break of more than 300% and an inherent viscosity of at least 0.5 determined in a 1% solution in hexamethyl phosphoramide at 25°, consisting of intralinear segments of the structure:

[—(O—D—O—CO—NH—Ro—NH—CO)$_r$—
(O—G—O—CO—NH—Ro—NH—CO)$_s$]$_m$—
[NH—NH—CO—NH—R—NH—
CO—NH—Ro—NH—CO—]$_n$ in which D represents a long chain, divalent aliphatic polymer residue of a higher molecular weight polyhydroxyl compound which has a molecular weight of 600 to 5000 and a melting point below 60°;

Ro represents a divalent organic radical of an aromatic, aliphatic, cycloaliphatic, araliphatic or heterocyclic diisocyanate;

G represents a divalent aliphatic, cycloaliphatic or araliphatic radical of a dialcohol which may contain one or more tertiary aliphatic amino groups and which has a molecular weight of between 62 and 300;

R is

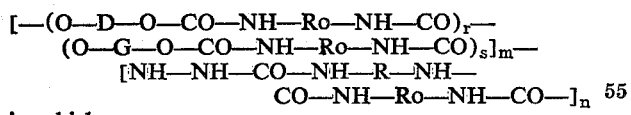

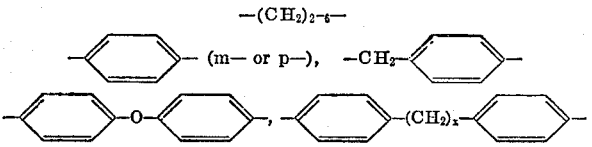

3. Highly elastic polyurethane elastomer fibers which have an elongation at break of at least 300% and a heat distortion temperature of above 145°, consisting of linear, segmented polyurethane elastomers which have an inherent viscosity (measured in a 1% solution in hexamethyl phosphoramide at 25°) of at least 0.5, containing intralinear segments of the structure:

[—(O—D—O—CO—NH—Ro—NH—CO)$_r$—
(O—G—O—CO—NH—Ro—NH—CO)$_s$]$_m$—
—[NH—NH—CO—NH—R—NH—
CO—NH—Ro—NH—CO—]$_n$ in which D represents a long chain, divalent aliphatic polymer residue of a higher molecular weight polyhydroxyl compound which has a molecular weight of 600 to 5000 and a melting point below 60°;

Ro represents a divalent organic radical of an aromatic, aliphatic, cycloaliphatic or araliphatic diisocyanate;

G represents a divalent aliphatic, cycloaliphatic or araliphatic radical of a dialcohol, if desired, containing one or more tertiary aliphatic amino groups with molecular weights of between 62 and 300;

R is

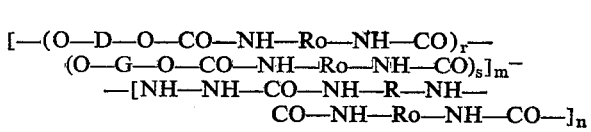

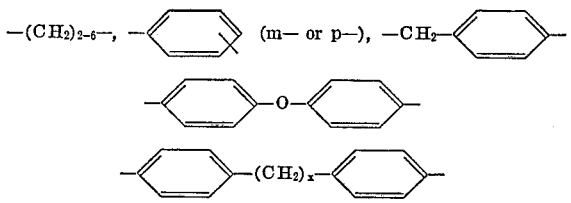

wherein
$x = 0, 1, 2$;
$r =$ an integer of 1 to 5;
$s = 0$ or an integer of 1 to 5;
$m =$ an integer of 1 to 5; and
$n =$ an integer of 1 to 5.

4. Solutions of polyurethane elastomers containing 10 to 33% by weight of a substantially linear, segmented polyurethane in a highly polar aliphatic solvent having amide, urea or sulphoxide groups and boiling points of up to 225°, said segmented polyurethane having linear repeating units of the formula
—NH.CO.NH.NH.CO.NH—R.NH.CO—NH—
in which R means a bivalent radical of the formula
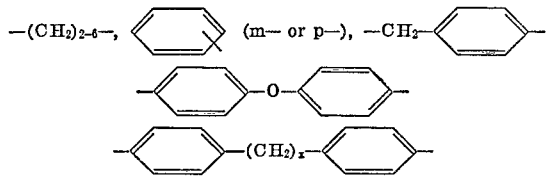
wherein $x=0, 1, 2.$
References Cited
UNITED STATES PATENTS
3,305,533  2/1967  Thoma et al. _____ 260—75
DONALD E. CZAJA, Primary Examiner
M. J. WELSH, Assistant Examiner
U.S. Cl. X.R.
260—30.8 R, 32.6 N, 47 CB, 75 NM, 77.5 AM, 77.5 SP, 554

UNITED STATES PATENT OFFICE
CERTIFICATE OF CORRECTION

Patent No. 3,658,746                    Dated April 25, 1972

Inventor(s) Friedrich Karl Rosendahl, et al.             -1-

It is certified that error appears in the above-identified patent and that said Letters Patent are hereby corrected as shown below:

| Column | Line | Error |
|---|---|---|
| 1 | 37 | "NCOC" should be ---NCO---. |
| 6 | 30 (formula) | "$(CH_2)_{2-6}$---" should be ---$(CH_2)_{\overline{2-6}}$---. |
| 9 | 45 | "point" should be ---points---. |
| 9 | after line 60- after formula insert | ---or in the case where "prechain lengthening" has been used, an NCO prepolymer of the following structure: OCN-RO-NH-CO-O-D-O-CO-NH-RO-NH-CO-O-D-O-CO-NH-RO-NH-C -O-G-O-CO-NH-RO-NCO- ---. |
| 10 | 13 | "use" should be "used". |
| 10 | 17 | "O" should be ---D---. |
| 14 | 30 | "100" should be ---1000---. |
| 15 | 10 | "20" should be ---200---. |
| 17 | 16-17 | should be ---Calculated for $C_{13}H_{13}N_3O_2$ (166.2) (percent) N,17.28. Found (percent) 17.3---. |
| 25 | Table 2 | "HWSA" should be centered over "In Air 20° MG/d.Tex"   "In Water 95° MG/d.Tex" |

UNITED STATES PATENT OFFICE
CERTIFICATE OF CORRECTION

Patent No. 3,658,746    Dated April 25, 1972

Inventor(s) Friedrich Karl Rosendahl, et al.    -2-

It is certified that error appears in the above-identified patent and that said Letters Patent are hereby corrected as shown below:

| Column | Line | Error |
|---|---|---|
| 25 | First Formula | Last "NH" should be ---$NH_2$---. |
| 28 | Table | "337" should be ---338---. |
| 28 | Table | "0.58" should be ---0.57---. |
| 28 | Table | "563" should be ---565---. |
| 28 | Table | "45" should be ---46---. |
| 28 | Table | "18" should be ---13---. |
| 28 | Table | "16" should be ---18---. |
| 6 | 13 (formula) | "NH-NH-$]_n$" should be ---NH-CO-$]_n$---. |

Signed and sealed this 17th day of September 1974.

(SEAL)
Attest:

McCOY M. GIBSON JR.
Attesting Officer

C. MARSHALL DANN
Commissioner of Patents